(12) United States Patent
Brehm et al.

(10) Patent No.: US 8,575,266 B2
(45) Date of Patent: Nov. 5, 2013

(54) PREPARING SILICONE EMULSIONS

(75) Inventors: Christof Brehm, Burghausen (DE); Robert Schroeck, Altoetting (DE)

(73) Assignee: Wacker Chemie AG, Munich (DE)

( * ) Notice: Subject to any disclaimer, the term of this patent is extended or adjusted under 35 U.S.C. 154(b) by 180 days.

(21) Appl. No.: 13/098,822

(22) Filed: May 2, 2011

(65) Prior Publication Data

US 2011/0269892 A1 Nov. 3, 2011

(30) Foreign Application Priority Data

May 3, 2010 (DE) .......................... 10 2010 028 491

(51) Int. Cl.
*C08G 77/06* (2006.01)

(52) U.S. Cl.
USPC ........................................................ 524/837

(58) Field of Classification Search
USPC ........................................................ 524/837
See application file for complete search history.

(56) References Cited

U.S. PATENT DOCUMENTS

| | | | |
|---|---|---|---|
| 2,891,920 | A | 6/1959 | Hyde et al. |
| 3,624,055 | A | 11/1971 | Gobran et al. |
| 6,605,351 | B1 | 8/2003 | Rossmy et al. |
| 2008/0064813 | A1 | 3/2008 | Schneider |
| 2012/0171147 | A1 | 7/2012 | Rautschek |

FOREIGN PATENT DOCUMENTS

| | | |
|---|---|---|
| CN | 102575103 A | 7/2012 |
| DE | 1495512 | 4/1970 |
| DE | 19742759 A1 | 4/1999 |
| JP | 03056534 A2 | 3/1991 |
| JP | 11302542 A2 | 11/1999 |
| JP | 2000-95661 | 4/2000 |
| JP | 2002-037888 | 6/2002 |
| JP | 2006160927 A2 | 6/2006 |
| JP | 2006-117868 | 11/2006 |
| WO | WO 9916834 | 4/1999 |
| WO | WO 2006/119916 A1 | 11/2006 |
| WO | 2009129175 A1 | 10/2009 |
| WO | WO 2011/032824 A1 | 3/2011 |

OTHER PUBLICATIONS

Ullmann's Encyclopedia of Industrial Chemistry, CD-ROM edition 2003, Wiley-VCH Verlag, headword "Emulsions".
English Translation of JP2000095661A provided by Thomson Innovation.
English Translation of JP2002037888A provided by Thomson Innovation.
English Translation of JP2006117868A provided by Thomson Innovation.
PatBase Abstract for WO 2011/032824 A1.
English abstract for JP11302542.
English abstract for JP 2006160927.
English abstract for JP 03056534.

*Primary Examiner* — Edward Cain
(74) *Attorney, Agent, or Firm* — Caesar, Rivise, Bernstein, Cohen & Pokotilow, Ltd.

(57) ABSTRACT

The invention provides a process for preparing emulsions of organopolysiloxanes (O), which includes polymerizing: (1) 100 parts by weight of hydroxyl-terminated organopolysiloxanes and (2) at least 0.01 part by weight of trialkylsilyl-terminated organopolysiloxanes having a viscosity of at least 55 mm$^2$/s in the presence of (3) acidic catalyst and (4) emulsifier in an aqueous medium until the desired molecular size is reached.

10 Claims, No Drawings

PREPARING SILICONE EMULSIONS

BACKGROUND

The invention relates to a process for preparing emulsions of organopolysiloxanes by polymerization of hydroxyl-terminated organopolysiloxanes and trialkyl-silyl-terminated organopolysiloxanes.

Preparing emulsions of organopolysiloxanes by emulsion polymerization is a long-established method. This applies particularly to the emulsion polymerization of cyclics. U.S. Pat. No. 2,891,920, for instance, describes the preparation of organopolysiloxane emulsions of low oil viscosity from octamethylcyclotetrasiloxane in the presence of strong alkalis or strong mineral acids.

DE 1495512 describes the simultaneous use of sulphonic acids and salts thereof as an emulsifier and a catalyst for emulsion polymerization of cyclic dimethylsiloxanes at different temperatures. However, the cyclic content of the resulting product is generally above 10%.

Different catalysts/emulsifiers/stabilizers for the purpose of obtaining more stable emulsions or emulsions of desired oil viscosity are described in many patents, for example DE 1495512. Particularly stable emulsions are stated therein to be obtainable by forming a pre-emulsion in particular.

Preparing emulsions of organopolysiloxanes in the presence of trimethylsilyl-terminated monomers is described in JP 2002-37888 and also JP 2000-95661. Similarly, U.S. Pat. No. 2,891,920 already describes this method for the eventuality that trimethylsilyl-terminated dimethylsiloxanes are to be obtained; cyclic dimethyl-siloxanes are emulsion polymerized therein together with hexamethyldisiloxane in a molar ratio of 99:1.

Preparing emulsions of organopolysiloxanes from hydroxyl-terminated organopolysiloxanes and cyclic organopolysiloxanes in an aqueous medium in the presence of a short-chain trialkylsilyl-terminated diorganopolysiloxane mandated to have a viscosity of not more than 50 mm²/s is described in JP 2006-117868.

This review shows that preparing emulsions of organopolysiloxanes by emulsion polymerization is very complex and—in relation to setting a suitable chain length and hence a suitable oil viscosity coupled with optimal emulsion properties such as shear and storage stability—difficult. This is mainly because the mechanism of an emulsion polymerization involves chain propagation and chain breakage taking place concurrently.

SUMMARY OF THE INVENTION

The invention provides a process for preparing emulsions of organopolysiloxanes (O), which comprises polymerizing
(1) 100 parts by weight of hydroxyl-terminated organo-polysiloxanes and
(2) at least 0.01 part by weight of trialkylsilyl-terminated organopolysiloxanes having a viscosity of at least 55 mm²/s
in the presence of
(3) acidic catalyst and
(4) emulsifier
in an aqueous medium until the desired molecular size is reached.

DETAILED DESCRIPTION OF THE INVENTION

The advantage of the process is, first, that the use of trialkylsilyl-terminated organopolysiloxanes (2) provides higher reproducibility with regard to the desired degree of polymerization of the organopolysiloxanes (O) than the use of hydroxyl-terminated organopolysiloxanes (1) or of cyclic dimethylsiloxanes alone, which is in accordance with the generally known procedure. The trialkylsilyl-terminated organopolysiloxane (2) reacts as a chain end stopper.

The process according to the invention has the second advantage that, in addition to emulsions of organo-polysiloxanes (O) of higher oil viscosity, those of lower oil viscosity are also very specifically obtainable with high reproducibility.

It was determined that, surprisingly, contrary to the use of monomers as in JP 2002-37888 or of low-viscosity polymers as in JP 2006-117868, trialkylsilyl-terminated organopolysiloxanes (2) having a viscosity of at least 55 mm²/s cannot only be used as efficiently but can also be significantly more accurately dosed to set the desired degree of polymerization, significantly facilitating the setting of the desired molecular weight.

Furthermore, the operation at the given temperatures and the time below 24 hours is economically particularly attractive and has a very advantageous effect on a very low formation of cyclic dimethyl-siloxanes, such as octamethylcyclotetrasiloxane or decamethylcyclopentasiloxane.

The emulsions obtained according to the invention are further characterized by their high stability in storage, even at elevated temperature, and by their high stability to shearing.

The process provides organopolysiloxanes (O) in the form of mixtures of doubly hydroxyl-terminated, doubly trialkyl-silyl-terminated and mixed hydroxyl/trialkyl-silyl-terminated organopolysiloxanes.

The process according to the invention preferably utilizes as hydroxyl-terminated organopolysiloxanes (1) polymers of the general formula 1

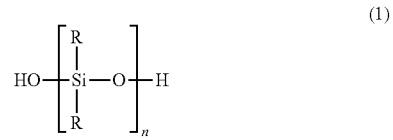

where
R denotes a monovalent saturated or unsaturated hydrocarbyl radical having 1 to 200 carbon atoms, preferably from 1 to 36 carbon atoms and more preferably from 1 to 8 carbon atoms, more particularly alkyl and preferably methyl or ethyl, which is unsubstituted or bears substituents containing elements selected from N, P, S, O, Si, H and halogen, and
n is selected such that the viscosity of the hydroxyl-terminated organopolysiloxane (1) is in the range from 5 to 80 000 mm²/s at 25 deg. C.

Trialkylsilyl-terminated organopolysiloxanes (2) are preferably polymers of the general formula 2

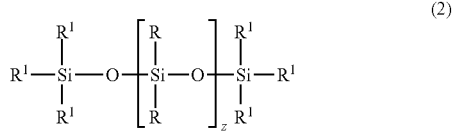

where
R has the above meanings, $R^1$ denotes an alkyl radical having 1 to 18 carbon atoms which may be interrupted by oxygen atoms, preferably methyl or ethyl, and z is chosen such that the viscosity of the trialkyl-silyl-terminated organopolysiloxane (2) is in the range from 55 to 50 000 mm$^2$/s at 25 deg. C.

Examples of hydrocarbyl radicals R are alkyl radicals, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl radicals, such as 2,2,4-trimethylpentyl; nonyl radicals, such as n-nonyl; decyl radicals, such as n-decyl; dodecyl radicals, such as n-dodecyl; octadecyl radicals, such as n-octadecyl; cycloalkyl radicals, such as cyclo-pentyl, cyclohexyl, cycloheptyl and methylcyclohexyl; alkenyl radicals, such as vinyl, 5-hexenyl, cyclo-hexenyl, 1-propenyl, allyl, 3-butenyl and 4-pentenyl; aryl radicals, such as phenyl, naphthyl, anthryl and phenanthryl; alkaryl radicals, such as o-tolyl, m-tolyl, p-tolyl; xylyl radicals and ethylphenyl radicals; and aralkyl radicals, such as benzyl, [alpha]-phenylethyl and [beta]-phenylethyl.

Preference for use as radical R is given to methyl, ethyl, octyl and phenyl and particular preference to methyl and ethyl.

Examples of halogenated radicals R are haloalkyl radicals, such as 3,3,3-trifluoro-n-propyl, 2,2,2,2',2',2'-hexafluoroisopropyl, heptafluoroisopropyl and haloaryl radicals, such as o-chlorophenyl, m-chlorophenyl and p-chlorophenyl.

Examples of radical $R^1$ are the alkyl radicals recited above in connection with R.

Examples of hydroxyl-terminated organosiloxanes (1) are commercially available polydimethylsiloxanes having silanol end groups.

These compounds are commercially produced in large volumes and are available very inexpensively, which makes the economics of the process according to the invention particularly attractive.

The process according to the invention can utilize one type of hydroxyl-terminated organopolysiloxane (1) or various types of hydroxyl-terminated organopolysiloxane (1).

The hydroxyl-terminated organopolysiloxanes (1) used in the process according to the invention preferably have viscosities of at least 10 mm$^2$/s, more preferably at least 20 mm$^2$/s and more particularly at least 50 mm$^2$/s and at most 60 000 mm$^2$/s, more preferably at most 10 000 mm$^2$/s and more particularly at most 1000 mm$^2$/s, all at 25 deg. C.

Trialkylsilyl-terminated organopolysiloxanes (2) are commercially produced in large volumes and are available very inexpensively, which makes the economics of the process according to the invention particularly attractive.

The process according to the invention can utilize one type of trialkylsilyl-terminated organopolysiloxane (2) or various types of trialkylsilyl-terminated organopolysiloxane (2).

The trialkylsilyl-terminated organopolysiloxanes (2) used in the process according to the invention preferably have viscosities of viscosities of at least 60 mm$^2$/s, more preferably at least 70 mm$^2$/s and more particularly at least 90 mm$^2$/s and at most 20 000 mm$^2$/s, more preferably at most 5000 mm$^2$/s and more particularly at most 2000 mm$^2$/s, all at 25 deg. C.

The process according to the invention preferably utilizes trialkylsilyl-terminated organopolysiloxane (2) in amounts of at least 0.02 part by weight, more preferably at least 0.05 part by weight and at most 80 parts by weight, more preferably at most 25 parts by weight and more particularly at most 15 parts by weight, based on 100 parts by weight of hydroxyl-terminated organopolysiloxane (1).

Preparing the present invention emulsions of organopolysiloxanes (O) is effected by intensive mixing of the hydroxyl-terminated organopolysiloxanes (1) in an aqueous medium with the trialkylsilyl-terminated organopolysiloxanes (2), surface-active, acidic catalysts (3) and an emulsifier (4) and optionally further substances (5) together. A stable emulsion is formed. As a result, the produced organopolysiloxanes (O) are in a finely divided form.

The process can be carried out as a batch operation or as a continuous operation.

Technologies for producing emulsions of organopolysiloxanes are known. The intensive mixing and dispersing can take place in rotor-stator stirred devices, colloid mills, high-pressure homogenizers, microchannels, membranes, jets and the like, or via ultrasound. Homogenizing equipment and methods are described for example in Ullmann's Encyclopedia of Industrial Chemistry, CD-ROM edition 2003, Wiley-VCH Verlag, under the headword "Emulsions".

The manner of mixing the components needed to produce the emulsions according to the invention is not very critical and can be practiced in various orders. Depending on components (1), (2), (3), (4) and optionally (5), however, there may be preferred procedures which should be examined on a case by case basis.

For example, components (1) and (2) can be pre-mixed with each other before the surface-active, acidic catalyst (3) and the emulsifiers are added and thereafter the dispersant and optionally further substances (5) are incorporated. It is also possible to dose components (1) to (3) or (1) to (4) or (1) to (5) in order into the emulsifying apparatus. It will in many cases prove to be advantageous for component (3) and/or component (4) or proportions of component (3) and/or component (4) to be initially charged into the emulsifying apparatus together with some of the dispersant and for the still remaining components (1) to (5) to be dosed into the mixture obtained. In particular cases it can be advantageous, for example by virtue of the siloxane viscosity or reactivity, to mix trialkylsilyl-terminated organopolysiloxane (2) with a hydroxyl-terminated organopolysiloxane (1) and then to incorporate some other hydroxyl-terminated organopolysiloxane (1), or vice versa, depending on what results in better rheological properties for the processing of the components.

The process of the present invention utilizes the dispersant water in amounts of preferably at least 1% by weight, more preferably at least 5% by weight and more particularly at least 10% by weight and at most 99% by weight, more preferably at most 95% by weight and more particularly at most 90% by weight, based on the total weight of all the ingredients of the emulsion.

Examples of acidic catalysts (3) are Brönsted acids, such as hydrochloric acid, hydrobromic acid, sulphuric acid, chlorosulphonic acid, phosphoric acids, such as ortho-, meta- and polyphosphoric acids, boric acid, nitric acid, benzenesulphonic acid, p-toluenesulphonic acid, methanesulphonic acid, trifluoromethanesulphonic acid and carboxylic acids, such as chloroacetic acid, trichloroacetic acid, acetic acid, acrylic acid, benzoic acid, trifluoroacetic acid, citric acid, crotonic acid, formic acid, fumaric acid, maleic acid, malonic acid, gallic acid, itaconic acid, lactic acid, tartaric acid, oxalic acid, phthalic acid and succinic acid, acidic ion exchangers, acidic zeolites, acid-activated fuller's earth and acid-activated carbon black.

It is preferable to use surface-active acidic polymerization catalysts (3), since they permit particularly specific and highly reproducible setting of the oil viscosity.

Useful surface-active, acidic polymerization catalysts (3) for the process according to the invention include a large number of sulphonic acids, hydrogensulphates and/or mono— or diesters (and/or mixtures) of phosphoric acid, which are not only water—but also oil-soluble.

Examples of useful sulphonic acids are aliphatically substituted naphthalenesulphonic acids, aliphatically substituted phenylsulphonic acids, aliphatic sulphonic acids, silylalkylsulphonic acids and aliphatically substituted diphenyl ether sulphonic acids. Aliphatic substituents for this purpose contain at least 6 carbon atoms, preferably at least 8 carbon atoms and more preferably at least 10 carbon atoms, and also preferably not more than 18 carbon atoms. Examples of such aliphatic substituents are hexyl, octyl, decyl, dodecyl, cetyl, myricyl, nonenyl, phytyl and penta-decadienyl radicals.

Examples of useful hydrogensulphates are alkyl hydrogensulphates having branched or unbranched alkyl radicals having at least 8 and more particularly 10 to 18 carbon atoms, such as hexyl, octyl, dodecyl, cetyl, stearyl, myricyl, oleyl and octynyl radicals.

Examples of useful esters of phosphoric acid are mono- and/or dialkyl (and/or mixtures) phosphoric esters with organic radicals such as branched or unbranched alkyl radicals having 4-30 carbon atoms, such as butyl, hexyl, 2-ethylhexyl, octyl, isononyl, dodecyl and iso-tridecyl radicals, unsaturated aliphatic radicals such as oleyl radicals, aromatic radicals, such as phenyl, toloyl, xylyl, nonylphenyl, naphthyl, anthracyl, tristyrylphenyl or benzyl radicals. The acid number of useful phosphoric esters is determined by the average value a of the number of organic radicals (where 1 a 2) and the molar mass, usually reported by the amount of KOH in mg needed to neutralize 1 g of the phosphoric ester. This acid number is preferably in the range of 10-500, more preferably in the range of 200-400 and more particularly in the range from 250 to 350.

Surface-active, acidic polymerization catalysts (3) may comprise not only an individual compound but also mixtures of two or more different compounds of the types mentioned. Mixtures will generally be used in practice, since these acids are but difficult to obtain pure because of their high molecular weight.

The process according to the invention preferably utilizes the acidic catalysts (3) in amounts of at least 0.1 part by weight, more preferably at least 0.4 part by weight and more particularly at least 0.8 part by weight and at most 50 parts by weight, more preferably at most 40 parts by weight and more particularly at most 30 parts by weight.

If surface-active acidic polymerization catalysts (3) that also act as emulsifiers are used, the addition of a separate emulsifier (4) can be dispensed with. In this case, components (3) and (4) are identical.

Emulsifiers (4) in the process according to the invention can be any previously known, ionic and nonionic emulsifiers—used not only individually but also as mixtures of various emulsifiers—wherewith aqueous dispersions, more particularly aqueous emulsions of organopolysiloxanes have also been obtainable previously. It is similarly possible to use, as will be known, inorganic solids as emulsifiers (4). Examples are silicas or bentonites as described in EP 1017745 A or DE 19742759 A.

Examples of anionic emulsifiers are:
1. Alkyl sulphates, particularly those having a chain length of 8 to 18 carbon atoms, alkyl and alkaryl ether sulphates having 8 to 18 carbon atoms in the hydrophobic moiety and 1 to 40 ethylene oxide (EO) or propylene oxide (PO) units.
2. Sulphonates, particularly alkylsulphonates having 8 to 18 carbon atoms, alkylarylsulphonates having 8 to 18 carbon atoms, taurides, esters and monoesters of sulphosuccinic acid with monohydric alcohols or alkyl-phenols having 4 to 15 carbon atoms; optionally, these alcohols or alkylphenols can also be ethoxylated with 1 to 40 EO units.
3. Alkali metal and ammonium salts of carboxylic acids having 8 to 20 carbon atoms in the alkyl, aryl, alkaryl or aralkyl moiety.
4. Phosphoric mono- and diesters and their alkali metal and ammonium salts, particularly alkyl and alkaryl phosphates having 8 to 20 carbon atoms in the organic moiety, alkyl ether and alkaryl ether phosphates having 8 to 20 carbon atoms in the alkyl or alkaryl moiety and 1 to 40 EO units.

Examples of nonionic emulsifiers are:
5. Polyvinyl alcohol with a degree of polymerization in the range from 500 to 3000 which still has 5 to 50%, preferably 8 to 20 vinyl acetate units.
6. Alkyl polyglycol ethers, preferably those having 3 to 40 EO units and alkyl radicals of 8 to 20 carbon atoms.
7. Alkylaryl polyglycol ethers, preferably those having 5 to 40 EO units and 8 to 20 carbon atoms in the alkyl and aryl radicals.
8. Ethylene oxide-propylene oxide (EO-PO) block copolymers, preferably those having 8 to 40 EO and/or PO units.
9. Addition products of alkylamines having alkyl radicals of 8 to 22 carbon atoms with ethylene oxide or propylene oxide.
10. Fatty acids having 6 to 24 carbon atoms.
11. Alkylpolyglycosides of the general formula R*—O—ZO, where R* denotes a linear or branched, saturated or unsaturated alkyl radical having on average 8-24 carbon atoms and ZO denotes an oligoglycoside radical having on average o=1-10 hexose or pentose units or mixtures thereof.
12. Natural substances and their derivatives, such as lecithin, lanolin, saponines, cellulose; cellulose alkyl ethers and carboxyalkylcelluloses, the alkyl groups of which each have up to 4 carbon atoms.
13. Linear organo(poly)siloxanes, in particular those having alkoxy groups with up to 24 carbon atoms and/or up to 40 EO and/or PO groups and containing polar groups containing more particularly the elements O, N, C, S, P, Si.

Examples of cationic emulsifiers are:
14. Salts of primary, secondary and tertiary fatty amines having 8 to 24 carbon atoms with acetic acid, sulphuric acid, hydrochloric acid and phosphoric acids.
15. Quaternary alkyl- and alkylbenzeneammonium salts, in particular those whose alkyl groups have 6 to 24 carbon atoms, more particularly the halides, sulphates, phosphates and acetates.
16. Alkylpyridinium, alkylimidazolinium and alkyloxazolinium salts, particularly those whose alkyl chain has up to 18 carbon atoms, specifically the halides, sulphates, phosphates and acetates.

The following are particularly suitable for use as ampholytic emulsifiers:
17. Amino acids having long-chain substituents, such as N-alkyl di(aminoethyl)glycine or N-alkyl-2-amino-propionic acid salts.
18. Betaines, such as N-(3-acylamidopropyl)-N,N-dimethylammonium salts having a $C_8$-$C_{18}$ acyl radical and alkylimidazolium betaines.

Preference for use as emulsifiers is given to nonionic emulsifiers, more particularly the alkyl polyglycol ethers recited above under 6. The constituent (4) can consist of one of the abovementioned emulsifiers or of a mixture of two or more of the above-mentioned emulsifiers, it can be used in pure form or as solutions of one or more emulsifiers in water or organic solvents.

The process of the present invention preferably utilizes the emulsifiers (4) in amounts of at least 0.1 part by weight, more preferably at least 0.4 part by weight and more particularly at least 0.8 part by weight and at most 80 parts by weight, more preferably at most 60 parts by weight and more particularly at most 30 parts by weight.

Examples of water-soluble solids useful as further substances (5) include, for example, inorganic salts such as alkali or alkaline earth metal halides, sulphates, phosphates, hydrogenphosphates, e.g., sodium chloride, potassium sulphate, magnesium bromide, calcium chloride, ammonium chloride, ammonium carbonate, or salts of $C_1$- to $C_8$-carboxylic acids such as alkali or alkaline earth metal salts, e.g. sodium acetate.

Examples of water-insoluble solids useful as further substances (5) are reinforcing and nonreinforcing fillers. Examples of reinforcing fillers, i.e. fillers having a BET surface area of at least 50 $m^2/g$, are pyrogenously produced silica, precipitated silica or silicon-aluminum mixed oxides having a BET surface area of more than 50 $m^2/g$. The fillers mentioned may be in a hydrophobicized state. Examples of nonreinforcing fillers, i.e. fillers having a BET surface area of less than 50 $m^2/g$, are powders of quartz, chalk, cristobalite, diatomaceous earth, calcium silicate, zirconium silicate, montmorillonites, such as bentonites, zeolites including molecular sieves, such as sodium aluminosilicate, metal oxides, such as aluminum oxide or zinc oxide and/or their mixed oxides or titanium dioxide, metal hydroxides, such as aluminum hydroxide, barium sulphate, calcium carbonate, gypsum, silicon nitride, silicon carbide, boron nitride, glass powder, carbon powder and plastics powder and hollow glass and plastics spheres.

The emulsifying step to produce the emulsion used in the process is preferably carried out at temperatures of at least 10° C., more preferably at least 15° C. and at most 80° C., more preferably at most 70° C.

The elevated temperature preferably comes about as a result of the introduction of mechanical shearing energy needed for the emulsifying operation. The elevated temperature is not needed to speed a chemical process. The process according to the invention is further preferably carried out at the pressure of the ambient atmosphere, but can also be carried out at higher or lower pressures.

The average particle size measured in the emulsions by light scattering is preferably at least 0.001 μm, more preferably at least 0.002 μm and at most 100 μm, more preferably at most 10 μm.

Carried out following the emulsifying step, the polymerization process which the invention provides to produce emulsions of organopolysiloxanes (O) is preferably carried out at temperatures of at least 1° C., more preferably at least 15° C. and at most 40° C., more preferably at most 35° C. The emulsion is preferably maintained at this temperature for a certain period, ideally below 24 hours, until the desired degree of polymerization is reached. Occasional or constant commixing can be advantageous here, and is achieved via any desired technical auxiliary means, such as rapid mechanical agitation or use of ultrasound.

After the desired time, the emulsion is neutralized with any desired alkaline agents in order to stop the chain propagation and the concurrently proceeding chain breakage reaction. The alkaline agent is added under agitation until a pH of about 7 is reached.

Useful alkaline agents for neutralizing, the emulsion include salts such as alkali or alkaline earth metal hydroxides, e.g. sodium hydroxide, potassium hydroxide, lithium hydroxide, alkali or alkaline earth metal carbonates, e.g. potassium carbonate, sodium carbonate, lithium carbonate or ammonium salts, e.g. ammonium hydroxide, or their aqueous solutions, or organic amines, e.g. triethanolamine (TEA), triethylamine, isopropylamine, or their aqueous solutions.

After the polymerization has ended, the organopolysiloxane (O) can be recovered in a virtually catalyst-free state by breaking the emulsion in any desired manner, for example by adding water-soluble organic solvents, e.g. methanol, ethanol, isopropanol, acetone, or by adding salts, such as sodium chloride, or by removing the water.

All the above symbols in the above formulae each have their meanings independently of each other. The silicon atom is tetravalent in all formulae. Parts by weight are always based on 100 parts by weight of hydroxyl-terminated organopolysiloxanes (1).

In the examples which follow, all amounts and percentages are by weight, all pressures are 0.10 MPa (abs.) and all temperatures are 20° C., unless otherwise stated in each case.

Example 1

An emulsifying apparatus (from PC-Laborsystem) is used to combine 5.20% by weight of isotridecyl decaethoxylate, 80% strength in water, commercially available under the trade name Lutensol® TO 108 (from BASF), 4.16% by weight of 4-$C_{10}$-$C_{13}$-sec-alkyl-benzene-sulphonic acid, commercially available under the trade name Marlon AS 3 (from Sasol) and 5.20% by weight of demineralized water into an emulsifier mixture to which 49.48% by weight of PDMS 1a (polydimethylsiloxanediol having a terminal OH group content of 0.765% by weight and a viscosity between 70 and 100 $mm^2/s$) and 1.40% by weight (2.75% by weight based on silicone content) of PDMS 2a (trimethylsilyl-terminated polydimethylsiloxane between 90 and 110 $mm^2/s$ in viscosity) are added a little at a time. Altogether 31.69% by weight of completely ion-free water is then added a little at a time for dilution to obtain a milkily white emulsion. After 20 hours of polymerization at 25° C., aqueous sodium hydroxide solution (25% strength by weight) is added for neutralization and preservation. The resulting stable emulsion having an average particle size of 133 nm has a solids content of 59.9% by weight. The siloxane polymer in a portion of emulsion is precipitated and washed with acetone. The dried polysiloxane has a viscosity of 114 000 $mm^2/s$ (25° C.)

Example 2

Example 1 is repeated mutatis mutandis except for the difference that the following starting materials were used: 3.74% by weight of isotridecyl decaethoxylate, 80% strength in water, 2.99% by weight of 4-$C_{10}$-$C_{13}$-sec-alkyl-benzene-sulphonic acid, 35.66% by weight of PDMS 1a and 3.00% by weight (3.76% by weight based on silicone content) of PDMS 2a. After 20 hours of polymerization at 25° C. and neutralization, a stable emulsion is obtained with an average particle size of 130 nm and a solids content of 45.3% by weight. The polysiloxane precipitated as in Example 1 has a viscosity of 17 900 $mm^2/s$ (25° C.)

Example 3

Example 1 is repeated mutatis mutandis except for the difference that the following starting materials were used: 3.74% by weight of isotridecyl decaethoxylate, 80% strength in water, 2.99% by weight of 4-$C_{10}$-$C_{13}$-sec-alkyl-benzene-sulphonic acid, 35.66% by weight of PDMS 1b (poldimethylsiloxanediol having a terminal OH group content of 0.418% by weight and a viscosity between 250 and 280 $mm^2/s$) and 1.50% by weight (4.04% by weight based on silicone content)

of PDMS 2a. After 20 hours of polymerization at 25° C. and neutralization, a stable emulsion is obtained with an average particle size of 125 nm.

The polysiloxane precipitated as in Example 1 has a viscosity of 59 400 mm$^2$/s (25° C.)

Example 4

Example 1 is repeated mutatis mutandis except for the difference that the following starting materials were used: 3.74% by weight of isotridecyl decaethoxylate, 80% strength in water, 2.99% by weight of 4-$C_{10}$-$C_{13}$-sec-alkyl-benzene-sulphonic acid, 35.66% by weight of PDMS 1a and 3.00% by weight (7.76% by weight based on silicone content) of PDMS 2b (trimethylsilyl-terminated polydimethylsiloxane between 330 and 370 mm$^2$/s in viscosity). After 20 hours of polymerization at 25° C. and neutralization, a stable emulsion is obtained with an average particle size of 126 nm.

The polysiloxane precipitated as in Example 1 has a viscosity of 63 700 mm$^2$/s (25° C.)

Examples 5-8

The following examples were prepared according to Example 1 or 2 mutatis mutandis, and exhibit the high reproducibility in respect of viscosity of the polysiloxane obtained by emulsion polymerization and use of PDMS 2a.

Even small differences in respect of the amount of trimethylsilyl-terminated polydimethylsiloxane 2a do not lead to larger variability in the desired viscosity:

TABLE 1

| Example | Amount of 1a | Amount of 2a (based on silicone content) | Viscosity |
| --- | --- | --- | --- |
| Example 5 | 35.66% by weight | 4.04% by weight | 58 600 mm$^2$/s |
| Example 6 | 35.66% by weight | 4.04% by weight | 61 900 mm$^2$/s |
| Example 7 | 49.41% by weight | 3.89% by weight | 60 200 mm$^2$/s |
| Example 8 | 49.48% by weight | 3.96% by weight | 61 100 mm$^2$/s |

Comparative Examples 9-13

Not According to the Invention

Example 1 is repeated mutatis mutandis except for the difference that the following starting materials were used: 3.74% by weight of isotridecyl decaethoxylate, 80% strength in water, 2.99% by weight of 4-$C_{10}$-$C_{13}$-sec-alkyl-benzene-sulphonic acid, 35.66% by weight of PDMS 1a and 0.23% by weight (0.64% by weight based on silicone content) of PDMS 2c (trimethylsilyl-terminated polydimethylsiloxane between 9 and 11 mm$^2$/s in viscosity). After 15 hours of polymerization at 20° C. and neutralization, a stable emulsion is obtained with an average particle size of 109 nm and a solids content of 42.0% by weight.

The polysiloxane precipitated as in Example 1 has a viscosity of 56 700 mm$^2$/s (25° C.)

The example is repeated, and polysiloxanes precipitated as in Example 1 are obtained with viscosities (as shown in Table 2 below).

The variability of the viscosities obtained is distinctly broader; the preparation of emulsions with polysiloxanes having defined viscosity ranges is not possible in a specific manner.

TABLE 2

| Example | Amount of 1a | Amount of 2c (based on silicone content) | Viscosity |
| --- | --- | --- | --- |
| Example 9 | 35.66% by weight | 0.64% by weight | 56 700 mm$^2$/s |
| Example 10 | 35.66% by weight | 0.64% by weight | 82 200 mm$^2$/s |
| Example 11 | 35.66% by weight | 0.64% by weight | 121 000 mm$^2$/s |
| Example 12 | 35.66% by weight | 0.59% by weight | 107 000 mm$^2$/s |
| Example 13 | 35.66% by weight | 0.59% by weight | 135 000 mm$^2$/s |

What is claimed is:

1. A process for preparing emulsions of organopolysiloxanes, which comprises polymerizing
   (1) 100 parts by weight of hydroxyl-terminated organopolysiloxanes and
   (2) at least 0.01 part by weight of trialkylsilyl-terminated organopolysiloxanes having a viscosity of at least 55 mm$^2$/s
   in the presence of
   (3) acidic catalyst and
   (4) emulsifier
   in an aqueous medium until a desired molecular size is reached,
   wherein the acidic catalyst comprises surface-active acidic polymerization catalysts selected from the group consisting of sulphonic acids, hydrogensulphates and mono- and diesters of phosphoric acid.

2. The process according to claim 1, wherein the hydroxyl-terminated organopolysiloxanes are polymers of the general formula 1

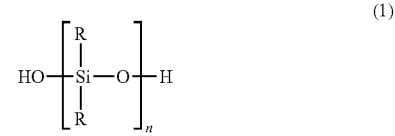

(1)

where
R denotes a monovalent saturated or unsaturated hydrocarbyl radical having 1 to 36 carbon atoms which is unsubstituted or bears substituents containing elements selected from the group consisting of N, P, S, O, Si, H and halogen, and
n is selected such that a viscosity of the hydroxyl-terminated organopolysiloxane is in a range from 5 to 80,000 mm$^2$/s at 25° C.

3. The process according to claim 1, wherein the trialkylsilyl-terminated organopolysiloxanes are polymers of the general formula 2

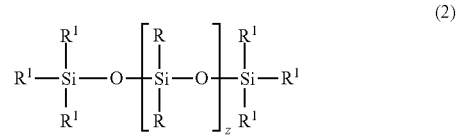

(2)

where
R denotes a monovalent saturated or unsaturated hydrocarbyl radical having 1 to 36 carbon atoms which is unsubstituted or bears substituents containing elements selected from the group consisting of N, P, S, O, Si, H and halogen, R¹ denotes an alkyl radical having 1 to 18 carbon atoms which may be interrupted by oxygen atoms, and z is chosen such that a viscosity of the trialkylsilyl-terminated organopolysiloxane is in a range from 55 to 50,000 mm²/s at 25° C.

4. The process according to claim 1, wherein the hydroxyl-terminated organopolysiloxanes have viscosities of 20 mm²/s to 10,000 mm²/s at 25° C.

5. The process according to claim 1, wherein the trialkylsilyl-terminated organopolysiloxanes have viscosities of 60 mm²/s to 20,000 mm²/s, each at 25° C.

6. The process according to claim 1, wherein the emulsifier comprises nonionic emulsifiers.

7. The process according to claim 1, wherein:

(a) the hydroxyl-terminated organopolysiloxanes are polymers of the general formula I

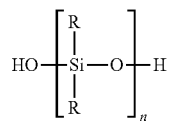

(1)

where

R denotes a monovalent saturated or unsaturated hydrocarbyl radical having 1 to 36 carbon atoms which is unsubstituted or bears substituents containing elements selected from the group consisting of N, P, S, O, Si, H and halogen, and n is selected such that a viscosity of the hydroxyl-terminated organopolysiloxane is in a range from 5 to 80,000 mm²/s at 25° C.; and (b) the trialkylsilyl-terminated organopoly-siloxanes are polymers of the general formula 2

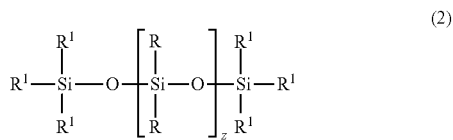

(2)

where

R is as defined above,

R¹ denotes an alkyl radical having 1 to 18 carbon atoms which may be interrupted by oxygen atoms, and z is chosen such that a viscosity of the trialkylsilyl-terminated organopolysiloxane is in a range from 55 to 50,000 mm²/s at 25° C.

8. The process according to claim 7, wherein the hydroxyl-terminated organopolysiloxanes have viscosities of 20 mm²/s to 10,000 mm²/s at 25° C.

9. The process according to claim 7, wherein the trialkylsilyl-terminated organopolysiloxanes have viscosities of 60 mm²/s to 20,000 mm²/s, each at 25° C.

10. The process according to claim 7, wherein the emulsifier comprises nonionic emulsifiers.

\* \* \* \* \*